(12) United States Patent
Gordh et al.

(10) Patent No.: US 8,950,542 B2
(45) Date of Patent: Feb. 10, 2015

(54) SYSTEM FOR DRIVER-VEHICLE INTERACTION

(75) Inventors: Mikael Gordh, Ytterby (SE); Risto Vahtra, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 137 days.

(21) Appl. No.: 13/606,762

(22) Filed: Sep. 7, 2012

(65) Prior Publication Data

US 2013/0239732 A1    Sep. 19, 2013

(30) Foreign Application Priority Data

Sep. 12, 2011 (EP) ...................................... 11180894

(51) Int. Cl.
  *G05G 1/02* (2006.01)
  *B60K 37/06* (2006.01)

(52) U.S. Cl.
  CPC *G05G 1/02* (2013.01); *B60K 37/06* (2013.01); *B60K 2350/1004* (2013.01); *B60K 2350/1036* (2013.01); *B60K 2350/928* (2013.01)
  USPC .................. 180/315; 200/61.57; 307/10.1

(58) Field of Classification Search
  USPC ............. 200/61.54, 61.57; 180/315; 307/10.1
  See application file for complete search history.

(56) References Cited

U.S. PATENT DOCUMENTS

| | | | | |
|---|---|---|---|---|
| 5,949,149 A | * | 9/1999 | Shitanaka et al. | 307/10.1 |
| 6,548,772 B2 | * | 4/2003 | Liburdi | 200/61.54 |
| 6,639,160 B2 | * | 10/2003 | Ibe et al. | 200/61.54 |
| 6,768,067 B2 | * | 7/2004 | Adachi et al. | 200/61.54 |
| 8,405,245 B1 | * | 3/2013 | Clay, II | 307/10.1 |
| 8,546,707 B2 | * | 10/2013 | Yorino | 200/5 A |
| 2003/0023353 A1 | | 1/2003 | Badarneh | |

FOREIGN PATENT DOCUMENTS

WO    WO 0160650 A1 *  8/2001
WO    2011082921 A1    7/2011

OTHER PUBLICATIONS

European Patent Office, Extended Search Report for corresponding European Patent Application No. 11180894.5 mailed Feb. 15, 2012.

* cited by examiner

*Primary Examiner* — Drew Brown
(74) *Attorney, Agent, or Firm* — Brooks Kushman P.C.

(57) ABSTRACT

A system for driver-vehicle interaction has a soft key arrangement located on a steering wheel and a display key arrangement located on a dashboard and having a layout corresponding to that of the soft key arrangement. The vehicle has multiple function modes each of which has a set of selectable options in order to affect a behavior of the vehicle. Each function mode is associated with a respective layout of the display key arrangement in order to display the set of options. For each function mode layout, each display key is illustrates and corresponds to a selectable option for each soft key. Actuation of the soft key arrangement both commands changes between the function modes and selects among the available selectable options within the chosen function mode.

7 Claims, 2 Drawing Sheets

SYSTEM FOR DRIVER-VEHICLE INTERACTION

CROSS-REFERENCE TO RELATED APPLICATIONS

This application claims foreign priority benefits under 35 U.S.C. §119(a)-(d) to EP 11180894.5, filed Sep. 15, 2011, the disclosure of which is hereby incorporated by reference in its entirety.

TECHNICAL FIELD

The present invention relates to a system for enabling a vehicle driver to control, monitor, and/or otherwise interact with various vehicle systems, such as infotainment and vehicle control systems.

BACKGROUND

In modern vehicles it has become important to give the driver of the vehicle a personalized driving experience and the possibility to control various functions of the vehicle through, for example, input buttons, joysticks or knobs. The more control functions the vehicle is provided with, the more input buttons and/or input menus are present in the vehicle. The design of these input buttons and input menus is vital for a positive driving experience and is a task that involves the question of how the driver perceives matters like symbols and grouping of buttons in order to make the interface intuitive.

One trend is to collect and to display the most vital information in and around the driver's line of sight to help the driver keep his/her sight and focus on the road ahead of the vehicle as opposed to have to look down to search for a certain menu or display. Some vehicles have even been provided with parts of the displayed information being put on display on the windscreen, a so called Head-up display. Less important and more seldom used items may be placed further away from the line of sight, such as on a center column between the front seats. Input buttons, joysticks or knobs may also be provided on the center column or on or around the front door handles.

An often used location for input buttons or similar is on the steering wheel or in close proximity of the steering wheel, where the driver mostly holds the hands during driving, in order to avoid requiring the driver to unnecessarily remove them from the steering wheel.

SUMMARY

A system for driver-vehicle interaction in a vehicle comprises a soft key arrangement which is adapted to be located proximate to a steering wheel of the vehicle and has at least two soft keys. Each soft key corresponds to a display key on a display key arrangement having a corresponding layout as the soft key arrangement. The display key arrangement is adapted to be located proximate to a dashboard of the vehicle. The system is associated with at least two function modes in a first set of function modes, each function mode being associated with a set of selectable options in order to affect behavior of the vehicle (or systems thereof) in each function mode. Each function mode is further associated with a respective layout for the display key arrangement in order to display the set of selectable options, whereby, for each function mode layout, each display key is adapted to illustrate and correspond to a currently available selectable option of the set of selectable options for each soft key, such that actuation of the soft key arrangement is adapted to both effectuate change between the function modes and to select at least one of the currently available selectable options associated with the chosen function mode.

The disclosed system allows the driver's visual field/focus to be kept around the line of sight upon the road ahead of the vehicle during driving. When the driver wishes to change function mode, only a short look on the display key arrangement is required for the driver to obtain the information on what soft key to actuate in order to affect the desired change. If the chosen function mode is accompanied by a set of selectable options, these options are displayed in the same display key arrangement as the initial choice, such that the driver does not need to either search with his or her eyes for another display key arrangement for the options, or search with his or her hands to find another soft key arrangement for selection of the desired choice. In other words, the driver may shift his/her gaze to the display key arrangement only once in order to find out what function mode is presently running, and may move e.g. a thumb onto the soft key arrangement only once to start flicking through the options available. The driver can therefor concentrate fully on driving again and now know where to find the display key arrangement to possibly take a quick look after each actuation of the soft key arrangement to find the desired function mode.

The system may be accompanied by a main menu corresponding to the choice of function mode from the first set of function modes, and a sub-menu for each main menu, corresponding to currently available selectable options. At least each one of these sub-menus is associated with a layout for the display key arrangement. The display key arrangement consequently changes layout when a function mode is chosen, thereby simplifying the use and the understanding of the system. Each main menu may furthermore be accompanied by a layout for the display key arrangement, such that the driver receives visual feedback on what function mode presently may be chosen. It is hence emphasized that the system is much simpler to use, and that driver workload/distraction has been reduced, by using the same soft key arrangement as actuator for both the choice of function mode and the currently available selectable options for each function mode.

The separation of the display key arrangement, where the currently available options are displayed, and the soft key arrangement, where the driver actuates the function modes and accompanying options, also helps the driver to maintain the hands at or in the proximity of the steering wheel instead of searching around the dashboard or the center column between the front seats for the proper soft key. Not only is this advantageous in order to maintain a grip on the steering wheel during normal driving, but it also assists the driver to retain a good driving position in general. During long driving times, a driver may put one hand somewhere else rather than on the steering wheel, and if doing so, safety may be lowered. However, by designing the soft key arrangement to be located in the proximity of the steering wheel, this encourages the driver's hold of the steering wheel during a function mode change, which in turn may encourage the driver to retain a proper driving position at a greater degree of the driving time. This separation of the system into a display key arrangement and a soft key arrangement further lessens the need for dedicated buttons for maneuvering functions of the vehicle. The system allows generic soft keys that may be given any number of options. The system is hence simple to use while keeping driving safety levels high.

According to an embodiment, the soft key arrangement and the display key arrangement correspond to a first set of key arrangements, the system further comprising a second soft key arrangement operatively associated with and represented by a second display key arrangement corresponding a second set of key arrangements, the second key arrangement corresponding to the first key arrangement and effectuating change in a second set of function modes. Addition of a second key arrangement allows a reduction in the number of function modes that a key arrangement is adapted to control, and/or an increase in the number of function modes that are possible to control by the system.

According to an embodiment, one of the first and second key arrangements is adapted to be located to the left and the other of the first and second key arrangements is adapted to be located to the right as seen in relation to a vertical line through a center of the steering wheel. Each key arrangement is hence located on opposite sides of the steering wheel and the display key arrangement and the soft key arrangement of each key arrangement are located on the same side of the steering wheel, making the association between the corresponding display key arrangement and soft key arrangement easily understandable for the driver.

According to an embodiment, the first set of function modes and the second set of function modes each is a group of functions modes so linked as to represent a logical grouping to the driver. The grouping into sets of function modes hence becomes easily recognizable for the driver, and each group comprises function modes that are linked so as to form a group of similar or related subjects.

According to an embodiment, the first set of function modes includes a set of driving modes, and the second set of function modes includes a set of infotainment modes. This grouping is clearly a grouping into two separate groups of related subjects, and within which each function mode has a logical link to the other function modes.

According to an embodiment, a display unit is adapted to be located in the proximity of the dashboard and is adapted to display information to the driver which is associated with each function mode. Not only may information related to the chosen function mode or to the choices available at each time be displayed in the associated display key arrangement, but to further emphasize and point to specific pieces of information, this may be done in an extra display unit, or a display unit used also for other purposes.

According to an embodiment, the display key arrangement is adapted to be located adjacent to or being a part of the display unit.

According to an embodiment, at least one soft key has a two dimensional generally flat surface extension. At least one soft key may have a tactile feature. The soft keys may be arranged in a tactile perceptible manner for the driver. These are all features intended to help the driver to keep the attention on the road ahead of the vehicle and to instead use his or her feel of the fingers to understand onto which soft key the finger is held.

According to an embodiment, each soft key arrangement and corresponding display key arrangement comprise five soft keys and display keys respectively. This is a number of input devices that is enough for designing a versatile but yet simple to understand system.

According to an embodiment, four of the soft keys are arranged equidistantly around a circle and one soft key is arranged centrally as seen in relation to the circle.

According to an embodiment, the four soft keys are touch keys and the one centrally located soft key is a depressible button. The soft key that is believed to be used the most is preferably designed to be the one simplest to find and to be most robust.

According to an embodiment, the soft key arrangement is adapted to be located on the steering wheel, and the display key arrangement is adapted to be located on the dashboard.

According to another disclosed embodiment, a system for driver-vehicle interaction in a vehicle comprises a first and a second key arrangement. Each key arrangement comprises a soft key arrangement and a related/corresponding display key arrangement, the soft key arrangements being adapted to be located in the proximity of a steering wheel of the vehicle and the display key arrangements being adapted to be located in the proximity of a dashboard of the vehicle. The vehicle and/or systems thereof have function modes that are controlled by the driver-vehicle interaction system, each function mode being associated with a set of selectable options in order to affect a behavior of the vehicle in each function mode. The function modes are grouped into a first and a second set of function modes so as to form a group of related subjects between function modes within each one of the first and second set of function modes, whereby the first key arrangement is associated with the first set of function modes and the second key arrangement is associated with the second set of function modes.

In the disclosed system, the driver's focus is kept around the line of sight upon the road ahead of the vehicle during driving. When the driver wishes to change a function mode, is becomes clear after just a few times using the system which key arrangement is adapted to effectuate a desired change, i.e. within which set of function modes the desired function mode is to be found. The grouping into sets of function modes hence becomes easily recognizable for the driver, and each group comprises function modes that are linked so as to form a group of similar or related subjects.

According to an embodiment, the first set of function modes is associated with driving modes of the vehicle and the second set of function modes is associated with infotainment modes of the vehicle. This grouping is clearly a grouping into two separate groups of related subjects, and within which each function mode has a logical link to the other function modes.

According to an embodiment, the first key arrangement is adapted to be located in an opposite relationship to the second key arrangement as seen in relation to the steering wheel or the dashboard. The display key arrangement and the soft key arrangement of each key arrangement are hence located on the same side of the steering wheel, making the association between the corresponding display key arrangement and soft key arrangement easily understandable for the driver.

According to an embodiment, the soft key arrangement has at least two soft keys, each soft key being associated with and represented by a display key on the display key arrangement having a corresponding layout as the soft key arrangement.

According to an embodiment, each function mode is associated with a respective positional layout or appearance of the display key arrangement in order to display the set of selectable options to the driver, whereby, for each function mode layout, each display key is adapted to illustrate and correspond to a currently available selectable option of the set of selectable options for each soft key, such that actuation of the soft key arrangement is adapted to both effectuate change between the function modes and to select between the currently available selectable options associated with the chosen function mode.

According to an embodiment, the system comprises a display unit located in the proximity of the dashboard, the display unit being adapted to display information to the driver which is associated with each function mode. Not only may information related to the chosen function mode or to the choices available at each time be displayed in the associated display key arrangement, but to further emphasize and point to specific pieces of information, this may be done in an extra display unit, or a display unit used also for other purposes.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle 1 may be any type of vehicle 1 having a driver controlled control system. Such vehicles 1 may include cars, lorries or trucks, vans, motorcycles, tractors or caterpillars, or the like.

In and throughout this application words such as vertical, horizontal, left and right will be given their normal meaning as seen from a driver's point of view when sitting in a driver's seat of the vehicle 1.

Figure 1:
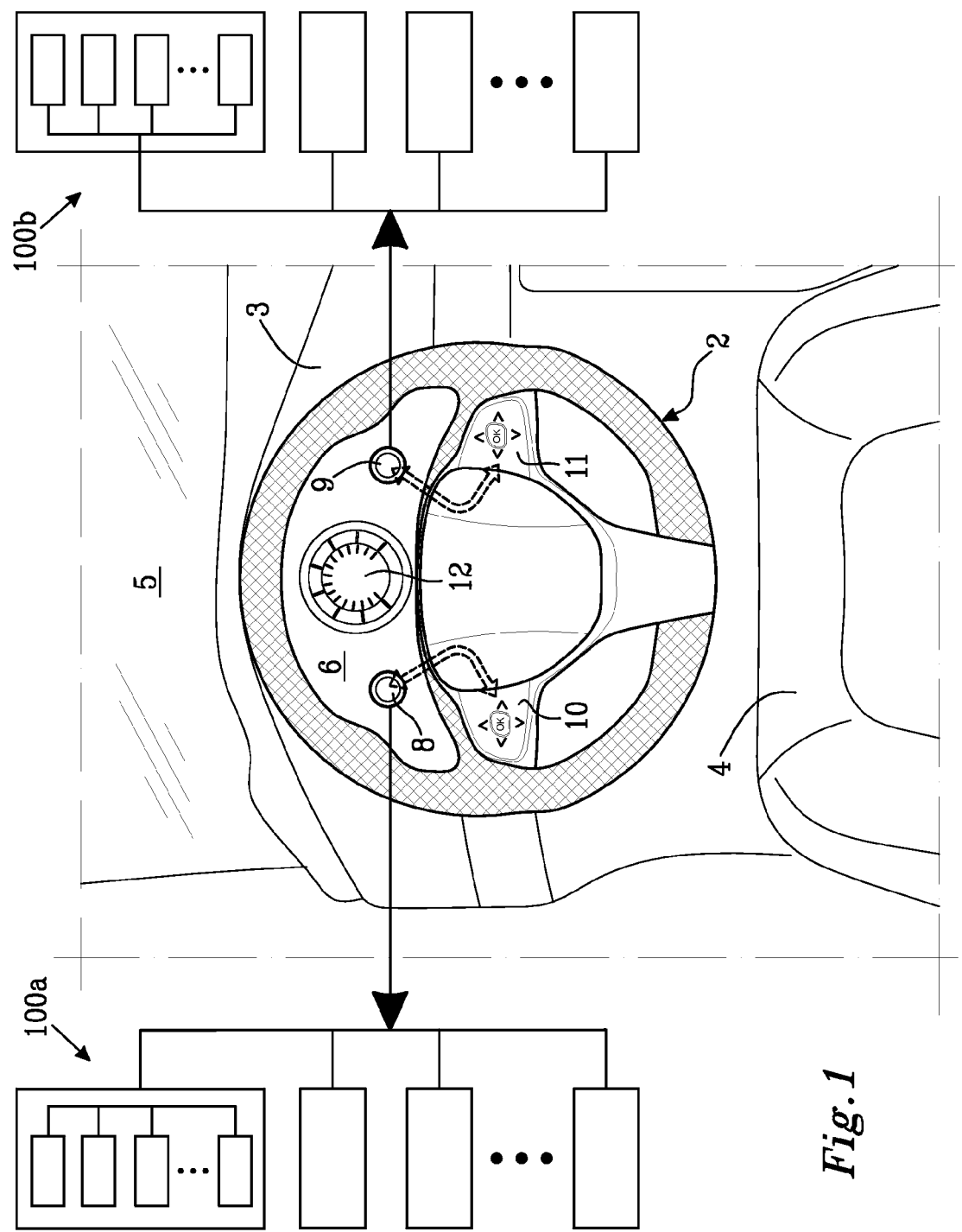
FIG. 1 shows a schematic representation of a driver environment in a vehicle having a system according to one disclosed embodiment.

The vehicle 1 in FIG. 1 comprises a steering wheel 2 in front of a dashboard 3, which dashboard 3 is at least to a certain extent visible to a driver driving the vehicle 1. The driver (not shown) is seated in a driver's seat 4 and looking out on a road through a windscreen 5. The driver has a normal, driving line of sight which runs from his or her eyes above the steering wheel 2 and the dashboard 4 through the windscreen 5 and to the road ahead of the vehicle 1. On the dashboard 3 there is a display screen 6 which is visible through the steering wheel 2. The display screen 6 may be an analogue display, a digital display or a combination thereof. The display screen 6 may show gauges or indications such as, for example, a speedometer, a tachometer, a meter showing the level of fuel remaining in the fuel tank and one showing the temperature of the engine. Other gauges, meters or information displays may be shown which are well known in the art.

The display screen 6 has two display portions 8, 9 which are located on either side of a central part 12 of the display screen 6, here shown as a central circle 12. The steering wheel 2 is provided with two key pads 10, 11, one on either side of a center of the steering wheel 2. The key pad 10 on the left hand side of the steering wheel 2 is operatively associated with the display portion 8 on the left hand side of the display screen 6. Similarly, the key pad 11 on the right hand side of the steering wheel 2 is operatively associated with the display portion 9 on the right hand side of the central part 12 of the display screen 6. These operative associations are indicated in FIG. 1 by arrows in broken lines. The key pads 10, 11 depicted are but one possible embodiment of a soft key arrangement 10, 11. The display portions 8, 9 are but one possible embodiment of a display key arrangement 8, 9.

Each key pad 10, 11 may include five positions, each or which is an input device for the control system. Each input device is a so called soft key. By touching or otherwise actuating one of the five input devices, the driver may select or change between different functions that are associated with the vehicle 1, and may choose between options that are available for selection within each function. Each input device may be marked with a generic symbol. For example, each key pad 10, 11 has a center input device in the form of a depressible button marked with the text "OK". Around this center input device are the remaining four input devices, which may be conveniently located at equal mutual distances as if they were located around a circle: One vertically above, one vertically below, one horizontally to the left, and one horizontally to the right of the center input device. These four input devices may also be depressible buttons, and may be formed in one piece with the surface of the key pads 10, 11 such that the driver does not feel any button edges, but rather a dent in the middle of each input device for tactile feedback. Each of the four input devices may be marked, for example, with an arrow: The upper input device marked with an arrow pointing upwards, the lower one with an arrow pointing downwards, the left hand sided one with an arrow pointing to the left, and the right hand sided one with an arrow pointing to the right. The input devices of the key pads 10, 11 as described above are but one possible embodiment of a soft key arrangement.

The term soft key is in and throughout this application used for a key which may be given different meaning when actuated at different situations, depending on the current mode of operation of the system and/or the vehicle 1. The current meaning of the soft key is normally shown in its corresponding display position.

Each display portion 8, 9 has a positional layout that corresponds to and/or is similar to the positional layout of its respective soft key pad 10, 11. In the present example, each display portion 8, 9 includes five positions, each one showing an available option for the position which is selectable for the driver. It may be that one or several of the display positions is switched off if there are less than five available options for selection at that particular moment. Both display portions 8, 9 have a center display position. Around this center display position are the remaining four display positions located at equal mutual distances, as if they were located around a circle. One is located vertically above, and one located vertically below the center display position, and one is located horizontally to the left, and one is located horizontally to the right as seen in relation to the center display position.

Each display portion 8, 9 may be seen as having a certain layout for each function, in which each layout includes the five display positions shown. It is noted that in order to make the layouts of the display portions 8, 9 graphically appealable, easily readable and intuitive to the driver, the design of the layouts is not limited to exactly the same design of the key pads 10, 11 and their respective input devices. The layouts may however, as long as the general layout is similar, use the area in and around each display portion 8, 9 in a more free way, such as making symbols larger than its corresponding input device or going outside of the area corresponding to the general shape of each key pad etc.

Due to the operative associations between e.g. the left side key pad 10 and the left side display portion 8, the upper input device of the key pad 10 corresponds to the upper display position on the display portion 8, such that a depression of the input device effects the option currently displayed by the display position. Corresponding operative associations for the other interconnected input devices and display positions result in corresponding effects. This results in a much diversified usability of the inventive system. The system may be programmed to include almost any number of functions which are to be controlled by the system, and for each function the options available for selection by the driver through each key pad 10, 11 and their respective input devices may be shown on the corresponding display portions 8, 9 and their respective display positions. These functions will be further discussed below.

The central part 12 of the display screen 6 shows in this embodiment is a circular, fully digital, color display. The display screen 6 incorporates both the central part 12 and the two display portion 8, 9 into one single, large digital display. It is consequently possible for the vehicle and/or system manufacturer to also display information to the driver at other locations on the display screen 6. The central part 12 may be provided with a circular outer ring showing, for example, a tachometer. At the bottom of the central part 12 and overlying the tachometer the current vehicle speed may be shown. Within the circular outer ring a circular area is formed which is used to further enhance the information shown in connection with the inventive system. If the driver actuates one of the key pads 10, 11 and the corresponding display portion 8, 9 consequently displays the currently available options, this may be further emphasized by putting the same or other related information on display within this ring. This ring may e.g. show a GPS road map, the currently broadcasted radio station, the name of and a possible image showing the origin of an incoming telephone call, the speed set in a cruise control system etc. This central part 12 of the display screen 6 is nevertheless not necessary for the inventive system.

Now we turn to the functionality of the system. The system is designed to manage and control a number of functions that are included in the vehicle 1, either as hardware or software. The function of the vehicle 1 is thus controlled by a corresponding mode of the inventive system. The words function and mode are used interchangeably in this application.

In general terms the vehicle 1 is provided with two sets of function modes: one set of function modes is an infotainment function mode and the other one is a driving function mode.

The word infotainment will in and throughout the present application be used to comprise matters such as information systems, music, radio and internet related matters, positioning systems such as the Global Positioning System (GPS), mobile telephone and message systems such as Short Message System (SMS), connections to other media players etc. Infotainment function modes thus includes a mode in which the vehicle 1 is connected to a mobile telephone of the driver and displays matters such as incoming calls, incoming SMS messages and shows a contact list if and when the driver initiates a telephone call. In another infotainment mode the system may be showing a radio channel presently broadcasting through the vehicle loudspeakers and the driver may inter alia change loudspeaker volume or change radio channel. A further infotainment mode may be a GPS mode in which the system may show different destinations between which the driver may choose, or the driver may through inter alia alphabetical input means (not shown) tick in a destination of own choice. Other infotainment modes may be an Internet mode in which the driver may, through inter alia. alpha-numeric input means, tick in a web page of own choice which the system displays on e.g. the display screen 6.

Driving modes for the vehicle 1 may include functions such as a manual driving in which the driver self is in total control of the driving behavior of the vehicle, a cruise control driving mode in which the driver sets a speed which the vehicle is trying to keep within certain tolerance limits and as long as the prevailing driving conditions allows such driving, and other more or less manual or automatic driving modes. These may be either pre-set by the vehicle or system manufacturer, or defined by the driver through input means in the vehicle.

Other functions modes lie within the scope of the invention.

The function modes are grouped into the two sets of function modes in order to help and guide the driver of the vehicle 1 to easily and intuitively find the correct key arrangement 8, 10; 9, 11 for controlling the desired function of the vehicle 1. There is a logical link between the function modes within each set of function modes so that each set forms a group of related subjects.

Turning again to FIG. 1, the above discussed two sets of function modes are denoted 100*a* and 100*b*. The driving function mode 100*a* is controlled by the left hand key arrangement 8, 10 and the infotainment function mode 100*b* is controlled by the right hand key arrangement 9, 11. This division will be apparent from the display portions 8, 9, but may also be easily remembered by the driver after having seen it just a few times. Each set of function modes 100*a*, 100*b* is illustrated in FIG. 1 each one as a set of main menus and corresponding sub-menus. These main menus are in the present inventive system designed as the above described layouts for each function mode and showing currently available selectable options for each function mode. The sub-menus consequently correspond to the currently available selectable options for each function mode. In other words, each main menu represents a function mode and each sub-menu represents an option.

During driving the driver may start the vehicle by driving it manually using the hands on the steering wheel 2, and feet on the acceleration and/or brake pedal (not shown). Now the system is keeping the vehicle 1 in a first driving function mode. The driver may want to listen to the radio and may do so by depressing either the right hand sided or the left hand sided input device on the right hand sided key pad 11 of the steering wheel 2. Hereby the driver changes between available infotainment function modes and this is made clear through corresponding change between layouts on the right hand side display portion 9. When finding the radio mode, the driver confirms the choice by depressing the center input device marked "OK" on the right hand side key pad 11. All of these choices are made using the right hand side thumb. When the "OK" button has been actuated, the corresponding layout, or sub-menu, is shown in the right hand side display portion 9. The next step is to make a radio station selection. The currently displayed layout is designed to highlight the upper and lower display positions of the right hand side display portion 9 so that the driver easily understands that by depressing either the upper or lower input device on the right hand side key pad 11, he or she may jump between a pre-programmed selection of radio stations. When the driver has found the radio station of choice he or she stops depressing the input devices, and within a few seconds the chosen radio station is put on the loudspeakers of the vehicle 1 by the system. Now the currently displayed layout is instead displaying the options of changing the volume of the loudspeakers up or down by highlighting again the upper and lower display positions corresponding to the upper and lower input devices of the right hand side key pad 11. During these different phases the central part 12 of the display screen 6 is further emphasizing certain parts of the choices at hand. At the point of final selection the central part 12 may e.g. disclose the currently broadcasted radio program or piece of music, text advertisements or similar information if such is accompanying the radio signal.

If the driver would like to use a cruise control he or she may select between the available driving modes by depressing either the right hand sided or the left hand sided input device in the left hand sided key pad 10 corresponding to the right hand sided or left hand sided display positions of the left hand sided display portion 8. The layout of the left hand side display portion 8 changes correspondingly. When finding the cruise control driving mode, the driver makes this choice and simultaneously sets the current speed as the set speed for the cruise control system by depressing the center input device marked "OK" on the left hand side key pad 10. This is a second driving function mode. The current layout of the left hand side display portion 8 now displays the options of increasing or decreasing the set speed by highlighting the upper and lower input devices on the left hand side display portion 8. If during cruise controlled driving, the driver needs to change gear or to brake, the cruise control system is put on hold until the driver resumes cruise controlled driving by again depressing the center input device. All of this is displayed in the left hand side display portion 8. During the "hold-phase" of this driving mode, this is displayed in the display portion 8 at the center display position. During these different phases the central part 12 of the display screen 6 is further emphasizing certain parts of the choices at hand. At the point of final selection the central part 12 may e.g. disclose the speed set by the cruise control system.

The system may be programmed to comprise any foreseeable number of function modes in each set of function modes. Also, the corresponding sub-menus or layouts may be programmed to comprise any foreseeable number thereof. The only system-related limitation is the number of currently available options may be limited to the number of input devices on each key pad 10, 11.

Figure 2:
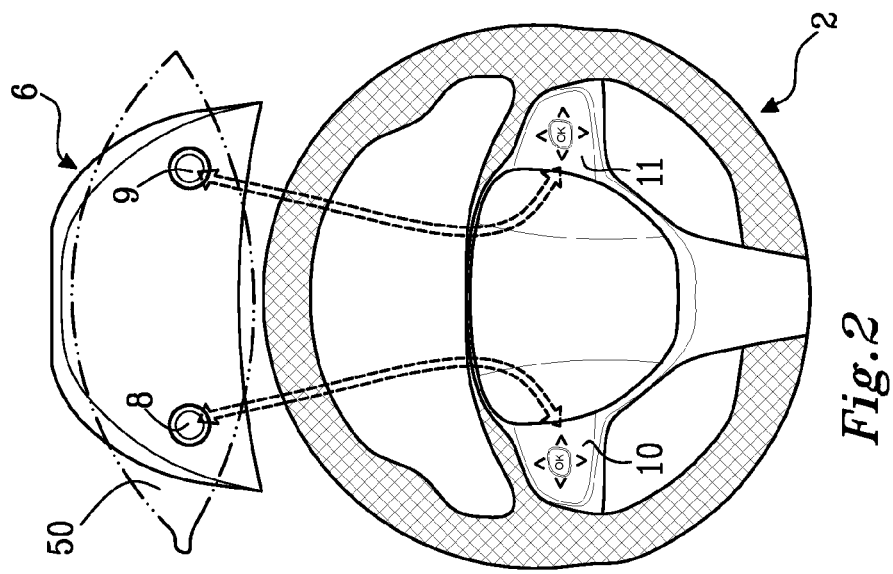
FIG. 2 shows a schematic representation of a steering wheel and a dashboard being provided with the embodiment of FIG. 1.

In FIG. 2 a schematic illustration discloses a system according to the invention which to a large extent is similar to the embodiment of FIG. 1. However, in this particular embodiment there is no central part of the display screen 6. At least not any central portion that displays information related to the inventive system. The embodiment is otherwise similar to the earlier described embodiment and reference may be made to the description of FIG. 1 for more details on the system. Items in FIG. 2 have been given the same reference numeral as in FIG. 1 when the item in function and design is similar. Any items left out in FIG. 2 is merely for space saving reason and not intended to imply any difference to the earlier embodiment.

In FIG. 2 the focus of the drivers attention is implied by a broken line marked 50 in the shape of an eye. The focus is on the road ahead of the vehicle and, when necessary, on the display screen 6 where the most often needed pieces of vital information is collected. It is emphasized that it is the intention of the disclosed system that the driver does not need to lower his or her sight down to have to look at the respective key pads 10, 11 on the steering wheel 2 in order to get information on what keys to press to activate the different function modes.

Figure 3:
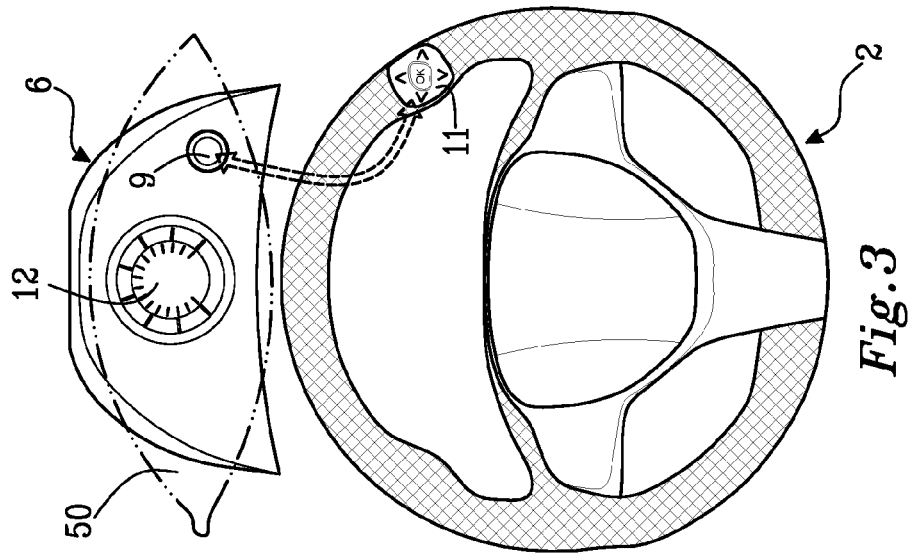
FIG. 3 shows a schematic representation of a steering wheel and a dashboard being provided with another embodiment of a system.

In FIG. 3 an embodiment is schematically illustrated in which there is only one display portion 9. In this particular embodiment the only display portion 9 is located on the right hand side of the display screen 6 and its central part 12, but it could instead have been located on the left hand side thereof. In a corresponding location on the steering wheel 2 a corresponding key pad 11 is located. In this embodiment the key pad 11 is located, not towards the center of the steering wheel 2, but along its periphery. Still the object is to give easy access to the key pad 11 by the driver's thumb without diverting attention away from the road ahead. Again a broken line 50 implies the focus of the driver's attention on the display screen 6. In this embodiment there is only one set of function modes controlling the functions of the vehicle 1. There is hence no possibility to group the function modes into different sets of function modes such that different key arrangements 8, 10; 9, 11 are adapted to control the different sets. On the other hand, the function modes may still be grouped, using a similar grouping idea as earlier described, such that one sets of function modes is followed by another set of function modes, and so on, so that the driver gets at least some intuitive feel for when a function of choice is appearing.

Figure 4:
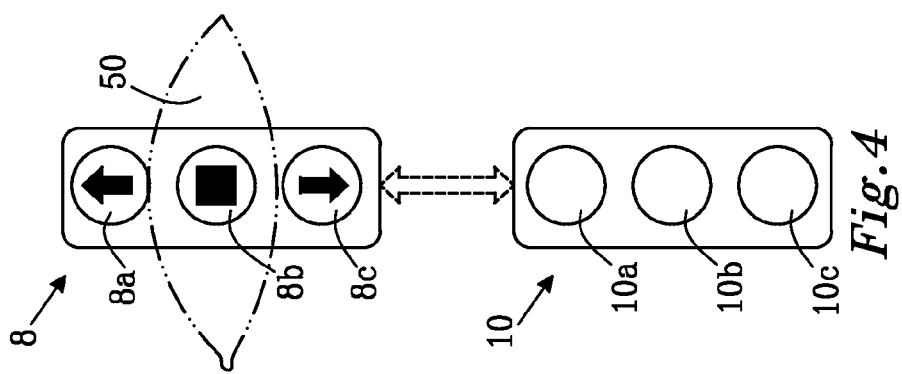
FIG. 4 shows a schematic representation of a key arrangement according to a further embodiment of a system.

FIG. 4 shows a schematic representation of a display portion 8 having only three display positions 8a, 8b, 8c, and a corresponding key pad 10 having the corresponding three input devices 10a, 10b, 10c. Here the input devices 10a, 10b, 10c and hence the display positions 8a, 8b, 8c are located in a vertical row, but any relative location may be used as long as the relative location correspond at least to a certain extent between the key pad 10 and the display portion 8. The input devices 10a, 10b, 10c are in this embodiment all of the type of depressible buttons.

Again the focus of the driver's sight is emphasized to be upon the display portion 8 by a broken line 50 in the form of an eye. In this embodiment it is not shown where in the vehicle 1 the key arrangement 8, 10 is located. The display portion 10 may advantageously be located anywhere in the proximity of the dashboard 3 of the vehicle 1, such as somewhere on the display screen 6 as in earlier embodiments, but also as or as well as a so called Head-up display on the windscreen 5. This is particularly suitable when the focus of the driver's attention must be on the road ahead of the vehicle 1. The key pad 10 should be located anywhere in the proximity of the steering wheel 2 of the vehicle 1, such as on knobs around the steering wheel 2 or possibly at a door handle of the vehicle 1 as long as the key pad 10 is within easy and direct reach of the steering wheel 2 and without forcing the driver to remove his or her sight on the road.

The embodiment of FIG. 4 is illustrated using the key arrangement 8, 10, but could just as well have been illustrated by the key arrangement 9, 11. It is most convenient if the display portion 8 is located in a similar position in relation to the driver as the corresponding key pad 10, but in this embodiment that is not as needed as in earlier described embodiments.

The present invention is not limited to the embodiments disclosed and described above. Rather, a number of alterations to the invention may be made without deferring from the scope as defined by the claims. Such alterations may include embodiments in which there is no centrally located display part 12 used in combination with the inventive system. Any display of information, such as the display portions 8, 10 may be used only or in combination with other means of display on a so called Head-up display on the wind screen 5. The display portions 8, 10 may optionally be followed by sound feedback to the driver when changing between different function modes or different sets of function modes. Other soft key arrangements 10, 11 may include a joystick, a ball, a thumb-wheel, a touch screen and not only may each soft key give the driver tactile feedback when placing a finger upon it, but may as well give sound feedback or visual feedback on the respective display key by highlighting the current display key. Furthermore, the soft keys within a soft key arrangement may have different design and give different feedback when touching it. One soft key may have a raised middle part, whereas another soft key within the same soft key arrangement may have a raised edge. The embodiments so far described have had either one or two key arrangements. It is contemplated that further key arrangements may be included in the system corresponding to and controlling an equal number of sets of function modes. One such added set of function modes may e.g. be the control of windscreen vipers, another control of an air conditioning system etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for driver-vehicle interaction in a vehicle, comprising a first and a second key arrangement, each key arrangement comprising a soft key arrangement and a corresponding display key arrangement, the soft key arrangements adapted for location proximate a steering wheel of the vehicle and the display key arrangements adapted for location proximate a dashboard of the vehicle, wherein the vehicle has a plurality of function modes, at least one of the function modes having a set of options selectable therein to affect a behavior of the vehicle in the at least one function mode, the plurality of function modes being grouped into a first set associated with driving modes of the vehicle and a second set associated with infotainment modes of the vehicle, the first set of function modes and the options selectable therein being operatively controllable using only the first key arrangement and the second set of function modes and the options selectable therein being operatively controllable using only the second key arrangement.

2. The system of claim 1, wherein the first key arrangement is adapted to be located in an opposite relationship to the second key arrangement as seen in relation to the steering wheel or the dashboard.

3. The system of claim 1, wherein each of the soft key arrangements has at least two soft keys, each soft key being associated with and represented by a display key of the display key arrangement having a corresponding positional layout as the soft key arrangement, and each function mode is associated with a respective positional layout of the display key arrangement to display the set of selectable options to the driver, whereby, for each function mode positional layout, each display key illustrates and correspond to a currently available selectable option of the set of selectable options for each soft key, such that actuation of the soft key arrangement effectuates selection of a one of the function modes and, after the one of the function modes is selected, selects between the options selectable within the selected function mode.

4. The system of claim 1, wherein the first and second display key arrangements are presented on a display unit adapted for location proximate the dashboard.

5. A system for driver-vehicle interaction in a vehicle, comprising:
a first soft key arrangement adapted for location on a first side of a steering wheel of the vehicle and having a plurality of soft keys actuatable by a driver to select a function mode from a first plurality of function modes associated with driving modes of the vehicle and, after selection of the function mode of the first plurality, further actuatable to control at least one set of options selectable within the selected function mode of the first plurality;
a first display key arrangement adapted for location on a first side of a dashboard of the vehicle and having a plurality of display keys operative to display function modes of the first plurality for selection using the first soft key arrangement and, after the selection of the function mode, operative to display the set of options selectable within the selected function mode such that each display key illustrates and corresponds to at least one of the set of selectable options associated with each soft key;
a second soft key arrangement adapted for location on a second side of a steering wheel of the vehicle and having a plurality of soft keys actuatable by a driver to control a second plurality of function modes associated with infotainment modes of the vehicle and, after selection of one of the function modes of the second plurality, actuatable to control at least one set of options selectable within the selected function mode of the second plurality; and
a second display key arrangement adapted for location on a second side of a dashboard of the vehicle and having a plurality of display keys operative to display function modes of the second plurality for selection using the second soft key arrangement and, after selection of the function mode, operative to display the set of options selectable within the selected function mode such that each display key illustrates and corresponds to at least one of the set of selectable options associated with each soft key.

6. The system of claim 5, wherein one of the first and second side of the steering wheel is located to the right as seen in relation to a vertical line through a center of the steering wheel.

7. The system of claim 5, wherein at least one of the first and second soft key arrangements comprises three soft keys and at least one of the first and second display key arrangement comprises three display keys.

* * * * *